United States Patent [19]

Ito

[11] Patent Number: 5,146,688
[45] Date of Patent: Sep. 15, 1992

[54] LOW POWER TILTMETER ELECTRONICS WITH COMPENSATION FOR BUBBLE LEVEL FLUID TEMPERATURE

[75] Inventor: Paul H. Ito, Los Angeles, Calif.

[73] Assignee: Rockwell International Corporation, Seal Beach, Calif.

[21] Appl. No.: 646,310

[22] Filed: Jan. 28, 1991

[51] Int. Cl.[5] ............................................. G01C 9/20
[52] U.S. Cl. ...................................... 33/366; 33/379; 364/571.03
[58] Field of Search ............................ 73/204.19, 497; 364/571.03; 340/501; 33/366, 379, 702; 374/133

[56] References Cited

U.S. PATENT DOCUMENTS

| | | | |
|---|---|---|---|
| 4,028,815 | 6/1977 | Buckley et al. | 33/366 |
| 4,099,415 | 7/1978 | Hartzell | 73/497 |
| 4,715,003 | 12/1987 | Keller et al. | 364/571.03 |
| 4,912,662 | 3/1990 | Butler et al. | 33/366 |

FOREIGN PATENT DOCUMENTS 0265682 3/1989 Fed. Rep. of Germany ........ 33/366

*Primary Examiner*—William A. Cuchlinski, Jr.
*Assistant Examiner*—Alvin Wirthlin
*Attorney, Agent, or Firm*—H. Fredrick Hamann; George A. Montanye; Tom Streeter

[57] ABSTRACT

Low power tiltmeter electronics with compensation for bubble level fluid temperature include compensating methods both for temperature-induced conductivity changes and temperature-induced viscosity changes in the bubble level fluid of a tiltmeter. The conductivity changes are compensated for by comparing the difference between the tilt conductances with the average of the tilt conductances. The viscosity changes are compensated for with a critically damped bandpass filter and a thermistor filter.

8 Claims, 4 Drawing Sheets

LOW POWER TILTMETER ELECTRONICS WITH COMPENSATION FOR BUBBLE LEVEL FLUID TEMPERATURE

BACKGROUND OF THE INVENTION

The present invention relates to bubble level based tiltmeters, and has particular relation to apparatus for compensating for the effects of temperature variations in the fluid containing the sensed bubble.

In the tiltmeter, just as in a carpenter's level, the position of a bubble against a curved upper surface is used either as part of a feedback loop to level the apparatus, or as a measurement device to determine how far from level the apparatus is. Whereas in a carpenter's level, the position of the bubble is measured by comparing it against marks in the glass container, in the tiltmeter, platinum electrodes and an electrically conductive fluid are used (typical composition is a potassium iodide electrolyte in an ethyl alcohol solution). An electrode is placed at the bottom center of the tiltmeter with other electrodes placed on the top surface. When the tiltmeter is tilted all the way to the left, the bubble will completely cover an electrode located across the right top surface, and no current can get through to it from the bottom electrode. If the tiltmeter is tilted all the way to the right, a left top surface electrode will be similarly isolated. When the tiltmeter is level, the bubble will lie between the top electrodes, and both will be in electrical contact with the central electrode.

If the top electrodes are made sufficiently large, the bubble will cover more or less of each of these electrodes as the tiltmeter tilts, and this variation in bubble position will result in a corresponding variation in the conductance between the bottom electrode and each of the top electrodes. This conductance can be measured with very high precision, allowing correspondingly high precision in the measurement of how far from horizontal the tiltmeter has tilted.

However, bubble level based tiltmeters are temperature sensitive, showing different amounts of indicated tilt for the same actual tilt measured at different temperatures. There are two sources of this temperature sensitivity.

First, the conductivity of the fluid changes with temperature. This affects the output of the tiltmeter directly.

Second, and less directly, the viscosity of the fluid changes with temperature. This has less importance in a semi-static situation, where only the long term tilt is of interest (for example, on an earthquake fault or on the side of a volcano which is subject to eruption). However, when short term tilt is of interest (to obtain a measure of the magnitude of the ongoing event), the term being short enough to be considered a low frequency (or even high frequency) oscillation, the amplitude of the bubble's oscillation is viscosity dependent: a bubble in a high viscosity fluid, and in a container subjected to an oscillation, will have a greater excursion from vertical, and thus a lesser excursion from the center point of the tiltmeter than will a bubble in a low viscosity fluid.

DETAILED DESCRIPTION OF A PREFERRED EMBODIMENT

There are several ways of attaining reduced tiltmeter temperature sensitivity and low power consumption.

Figure 1:
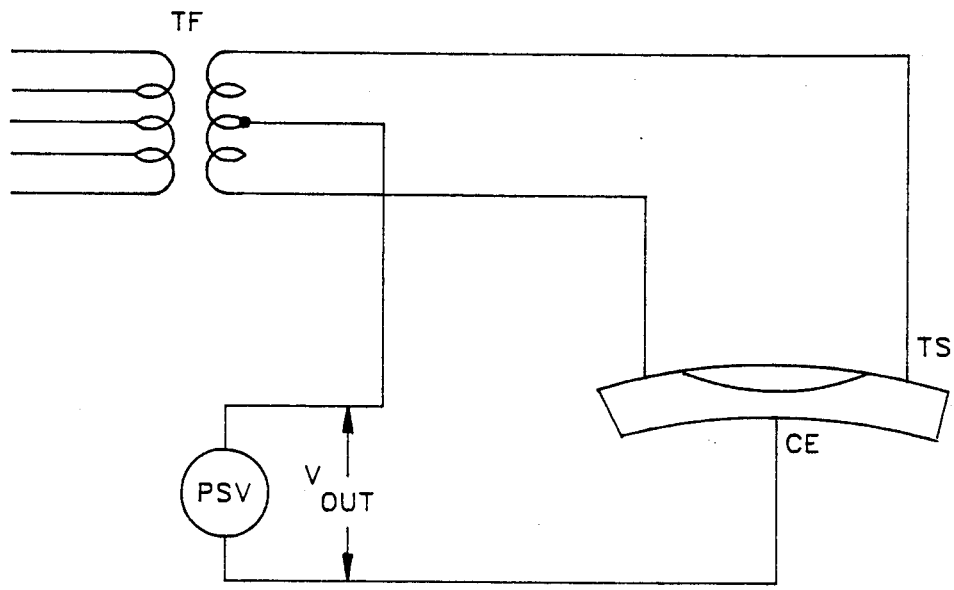
FIG. 1 is a schematic of a center tapped transformer driving a tilt sensor.

The first way has the desirable feature of insensitivity to temperature induced variations in the conductivity of the bubble fluid. As shown in FIG. 1. a center tapped transformer TF drives the tilt sensor TS, with the voltage on the center electrode CE of the tilt center being compared, by a phase sensitive voltmeter PSV, with the voltage on the center tap of the transformer. Any temperature induced variation in the difference in the conductivities is counter balanced by the same temperature induced variation in the average of the conductivities. However, the use of a transformer usually requires that power consumption be on the order of milliwatts, and the third way, shown below, has a power consumption on the order of microwatts. Also, transformer componentry is not as readily adaptable for micro-circuit packaging techniques such as custom large scale integration, hybrid, or surface mount.

Figure 2:
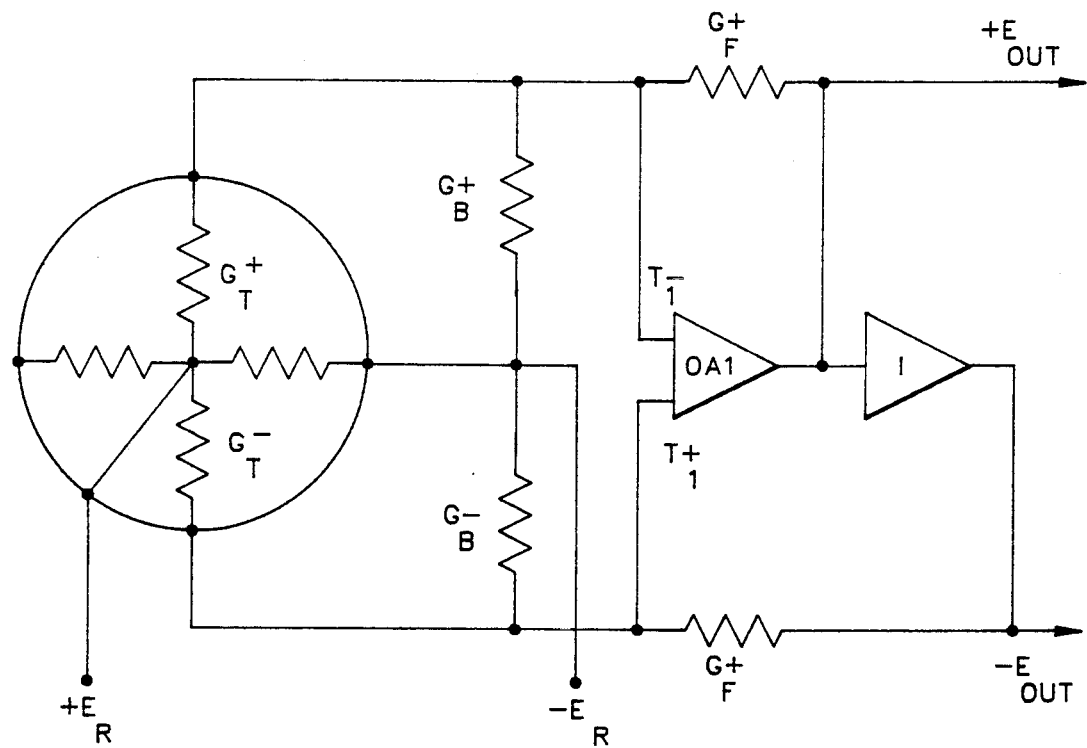
FIG. 2 is a schematic of a semiconductor driven tiltmeter, with bridge conductances.

The second way uses semiconductors rather than transformers, and is shown in FIG. 2. The outputs of the tilt conductances $G_T+$ and $G_T-$ respectively drive the + and − inputs $T_I-$ and $T_I+$ of an op amp $OA_I$. While only two conductances have been given reference characters $G_T+$ and $G_T-$, four conductances are shown. This is a reminder that the preferred bubble level based tiltmeter measures tilts about two axes. The electronics shown herein should be duplicated and applied to each axis output of the tiltmeter. High power is avoided, but temperature sensitivity is not. The difference between the tilt conductances $G_T+$ and $G_T-$ (the conductance from the bottom electrode to one top electrode and from the bottom electrode to the other top electrode) is compared with a pair of electronic circuit feedback conductances, $G_F+$ and $G_F-$. $G_F+$ connects the output of $OA_I$ to $T_I-$, and $G_F-$ connects the output of an inverter I (the input of which is also the output of $OA_I$) to $T_I+$. Unfortunately, the electronic circuit feedback conductances $G_F+$ and $G_F-$ differ from the tilt conductances $G_T+$ and $G_T-$ in that the feedback conductances $G_F+$ and $G_F-$ are relatively insensitive to temperature changes, while the tilt conductances $G_T+$ and $G_T-$ are very sensitive to temperature changes since, as the ethyl alcohol gets warmer, it allows the potassium iodide ions to move through it with greater speed.

This problem arises because of the presence of the two electronic circuit bridge conductances $G_B+$ and $G_B-$. Their presence establishes a countervailing voltage $-E_R$ to the reference voltage $E_R$ applied to the central (bottom) electrode of the tiltmeter. This, in effect, produces a cancellation of the average of the two tilt conductances $G_T+$ and $G_T-$. However, this action results in a net comparison of the remaining temperature sensitive component, the difference conductance term $G_T^+ - G_T^-$, with the temperature insensitive feedback conductances, $G_F^+$ and $G_F^-$. Thus, the positive output voltage $E_{OUT}$ (the output of $OA_j$) and the negative output voltage $-E_{OUT}$ (the output of the inverter I) are not precisely what is desired.

Figure 3:
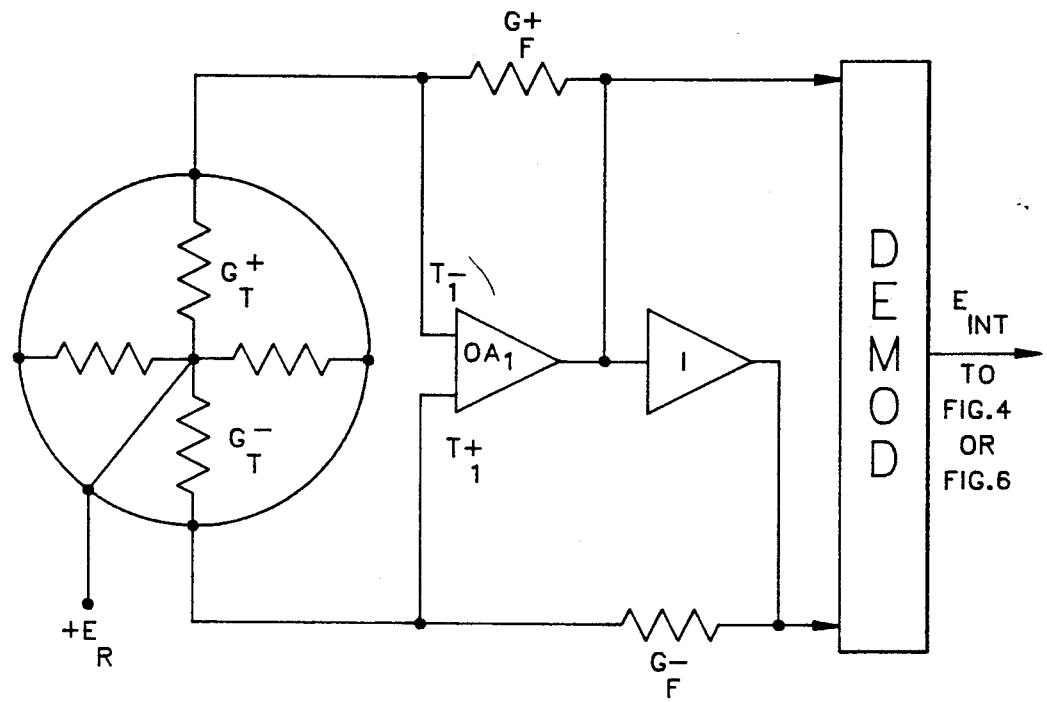
FIG. 3 is a schematic of the more important components of a semiconductor driven tiltmeter, without bridge conductances.

These bridge conductances $G_B^+$ and $G_B^-$, and the countervailing voltage $-E_R$ driving them, are removed in the third way, which is preferred, and which is shown in FIG. 3. Further, the feedback conductances $G_F^+$ and $G_F^-$ are made much smaller than the average of the two tilt conductances $G_T^+$ and $G_T^-$. As a result, the difference between the two tilt conductances $G_T^+$ and $G_T^-$ is compared with the average of the tilt conductances $(G_T^+ + G_T^-)/2$, rather than with the feedback conductances $G_F^+$ and $G_F^-$. Thus, any temperature induced variation in the difference between the two tilt conductances $G_T^+$ and $G_T^-$ is exactly counter balanced by the corresponding temperature induced variation in the average of the two tilt conductances $(G_T^+ + G_T^-)/2$.

The voltages heretofore described have been ac voltages, as a dc voltage would cause potassium iodide ions to deposit on the electrodes and degrade the conductive property of the fluid. The preferred ac voltage is a 4.2 kilohertz triangle voltage. The outputs of the feedback conductances $G_F^+$ and $G_F^-$ are therefore fed to a demodulator DEMOD which removes the 4.2 kilohertz carrier and produces an intermediate dc voltage $E_{INT}$ to be fed to FIG. 4.

Figure 4:
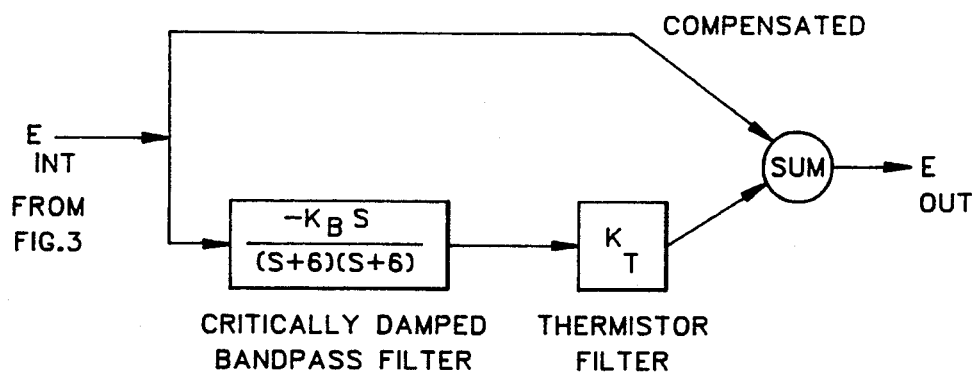
FIG. 4 is a block diagram of the operation of a viscosity compensation filter.

FIG. 4 shows how this signal, which has been processed to reduce or eliminate fluid conductivity problems, but not fluid viscosity problems, may be further processed by a critically damped bandpass filter which drives a thermistor filter, the output of which is summed by a summer with the uncompensated voltage to produce a final output voltage.

Figure 5:
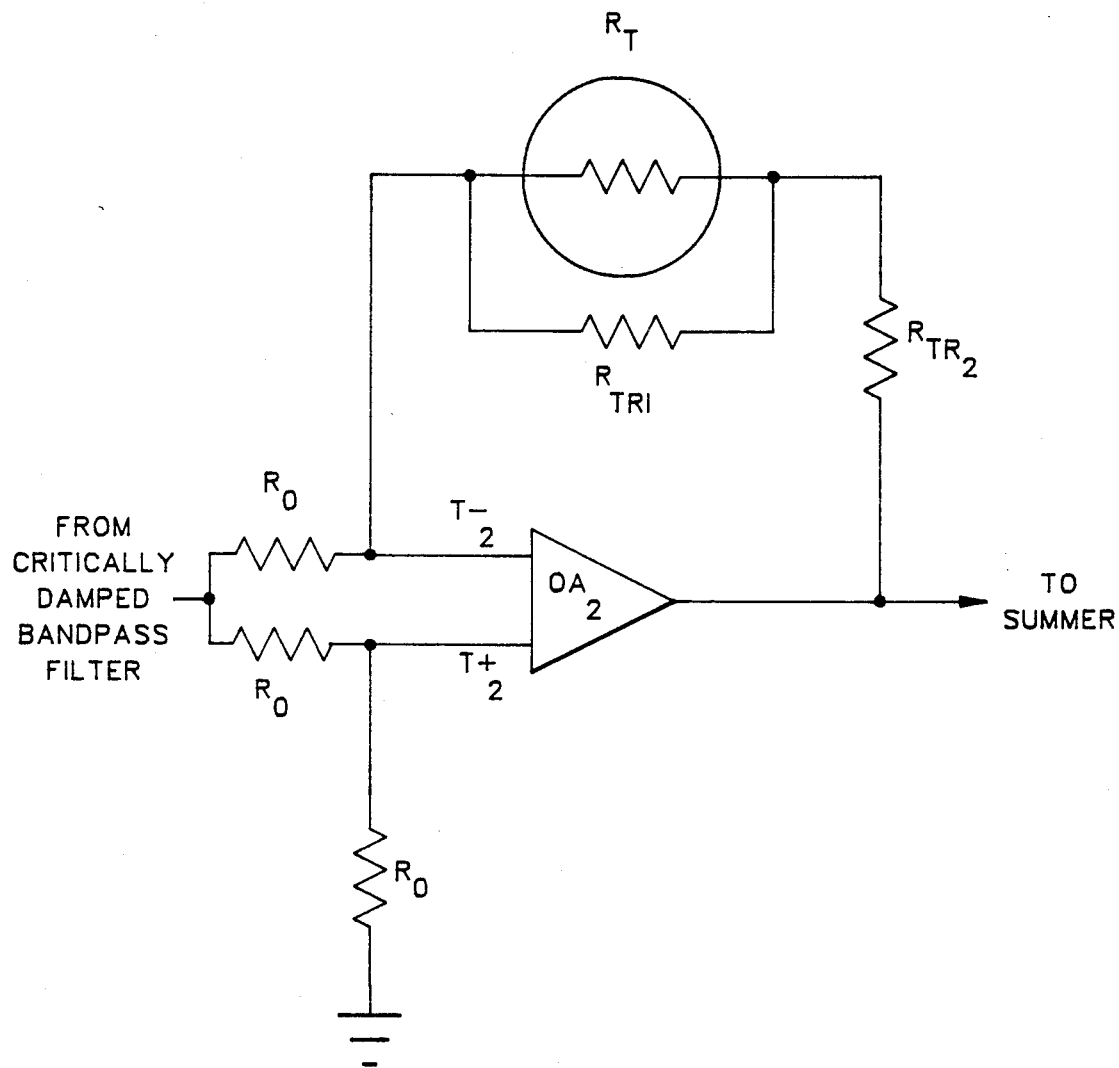
FIG. 5 is a schematic of the $K_T$ thermistor driven filter included in FIG. 4.

FIG. 5 shows in greater detail the thermistor filter shown only in block form in FIG. 4. The conductance of a thermistor $R_T$ changes with its temperature, and, with appropriate parallel and series trimming resistors $R_{TR1}$ and $R_{TR2}$, its two terminal conductance characteristic can be made to mimic the temperature dependent viscosity characteristics of whatever fluid is being used. The input from a low Q (critically damped) bandpass filter, described below, is passed through a pair of resistances $R_o$ to the terminals $T_2^-$ and $T_2^+$ of a second op amp $OA_2$. $T_2^+$ is connected to ground through a third resistance of equal value $R_o$. The output of $OA_2$ is fed back to input $T_2^-$ through a thermistor $R_T$, which has a first trimming resistor $R_{TR1}$ connected in parallel with it and a second trimming resistor $R_{TR2}$ connected in series with it. The output of $OA_2$ is fed to a summer, also described below.

It will be noted that, with the above mechanization, $$(12 + K_B \cdot K_T) = RT,$$

where RT is the thermistor and trim resistors. The significance of this fact becomes apparent in the analysis of FIG. 4. made below.

It should be noted that thermistors were not used in compensating for temperature dependent conductance changes, and are being used only to compensate for temperature induced viscosity changes. The portion of the present invention shown in FIG. 3 therefore will compensate for any kind of conductance change, due to, for example, a reaction between the electrolyte and the electrodes. However, it will compensate only for temperature induced viscosity changes, and not for viscosity changes due to any other source.

The voltage produced by the FIG. 3 apparatus, that is, by the tiltmeter compensated for the temperature induced conductance changes but not compensated for temperature induced viscosity changes, is proportional to a first constant $K_A$, and is inversely proportional to a quadratic term, $S^2 + DS + 36$, where S is the notation for the complex variable term j $(j = (-1)^{\frac{1}{2}})$ multiplied by the radian frequency of the tiltmeter oscillations, and D is proportional to viscosity. $K_A$ is determined by the excitation voltage $E_R$ and electronic Constants; that is, $K_A$ is the constant term of the front end section, shown in FIG. 3, which includes both bubble level and conductance compensation electronics.

It now becomes necessary to compensate for temperature induced viscosity changes. At 30° C., D (described in the previous paragraph) is approximately equal to 12, so the quadratic term is approximately equal to $(S+6)^2$. However, at temperatures below 30° C., D is greater than 12 and at above 30° C., D is less than 12. It is therefore important to compensate this quadratic term in the viscosity compensation electronics so that, when the oscillation frequency is in the neighborhood of 6 radians per second, an uncompensated voltage oscillation input when the tiltmeter is colder than 30° C. will result in a somewhat larger amplitude compensated voltage oscillation output; and so that an uncompensated voltage oscillation input when the tiltmeter is hotter than 30° C. will result in a somewhat smaller amplitude compensated voltage oscillation output.

FIG. 4 shows a block diagram of the operation of the filter, including how the thermistor multiplier $K_T$ shown in FIG. 4 interacts with the remainder of the filter. This is done by splitting the uncompensated voltage $E_{IN}$, and feeding part of it directly to a summer SUM, while the other part is multiplied by $K_B S$ divided by $(S+6)^2$, a critically damped bandpass filter. $K_B$ is thus seen as a constant term of only the critically damped bandpass filter, which is part of the back end (FIG. 4) section of the tiltmeter electronics. $K_B$ has significance because its value, in combination with $K_T$, provides the proper gain for the viscosity compensating signal. The output of the critically damped bandpass filter is then multiplied by $K_T$, where $K_T$ is a thermistor controlled variable gain, selected to match the apparatus and fluid. The viscosity uncompensated voltage $E_{INT}$ thus results in a compensated voltage $E_{OUT}$.

Any filter which functions as described above will get the job done. The filter has only three components: a $K_B S/(S+6)^2$ component (the critically damped bandpass filter), a $K_T$ component, and a summer SUM. The uncompensated signal $E_{IN}$ is split so that one input terminal of the summer receives the uncompensated signal directly, while the other input terminal of the summer receives that same signal only after it has first passed through the $K_B S/(S+6)^2$ component, and the $K_T$ component, in that order. The output of the summer SUM is the output of the filter. Such a filter gets the job done because a theoretical analysis of the filter, as well as actual experience with it, demonstrates that it will exactly compensate for the temperature induced effects on the viscosity of the fluid, and will do so over a wide band of frequencies of interest.

Mathematically, the transfer function $E_{OUT}/E_{INT}$ can be described as:

$$\frac{E_{OUT}}{E_{INT}} = 1 + \frac{K_B \cdot K_T S}{(S+6)(S+6)}$$

$$= \frac{S^2 + (12 + K_B \cdot K_T)S + 36}{(S+6)(S+6)}$$

Thus, for the overall tiltmeter transfer function:

Tilt angle $\rightarrow \dfrac{K_A}{S^2 + DS + 36}$  (FIG. 3)

$\rightarrow \dfrac{S^2 + (12 + K_B \cdot K_T)S + 36}{(S+6)(S+6)}$  FIG. 4

$\rightarrow E_{OUT}$

As pointed out above, $(12 + K_B \cdot K_T) = R_T$, where $R_T$ is the thermistor and trim resistors. This relationship is the result of the following reasoning. The transfer function $K_T$ is, from FIG. 5, $$K_T = \tfrac{1}{2}(1 - R_T/R_o).$$

Figure 6:
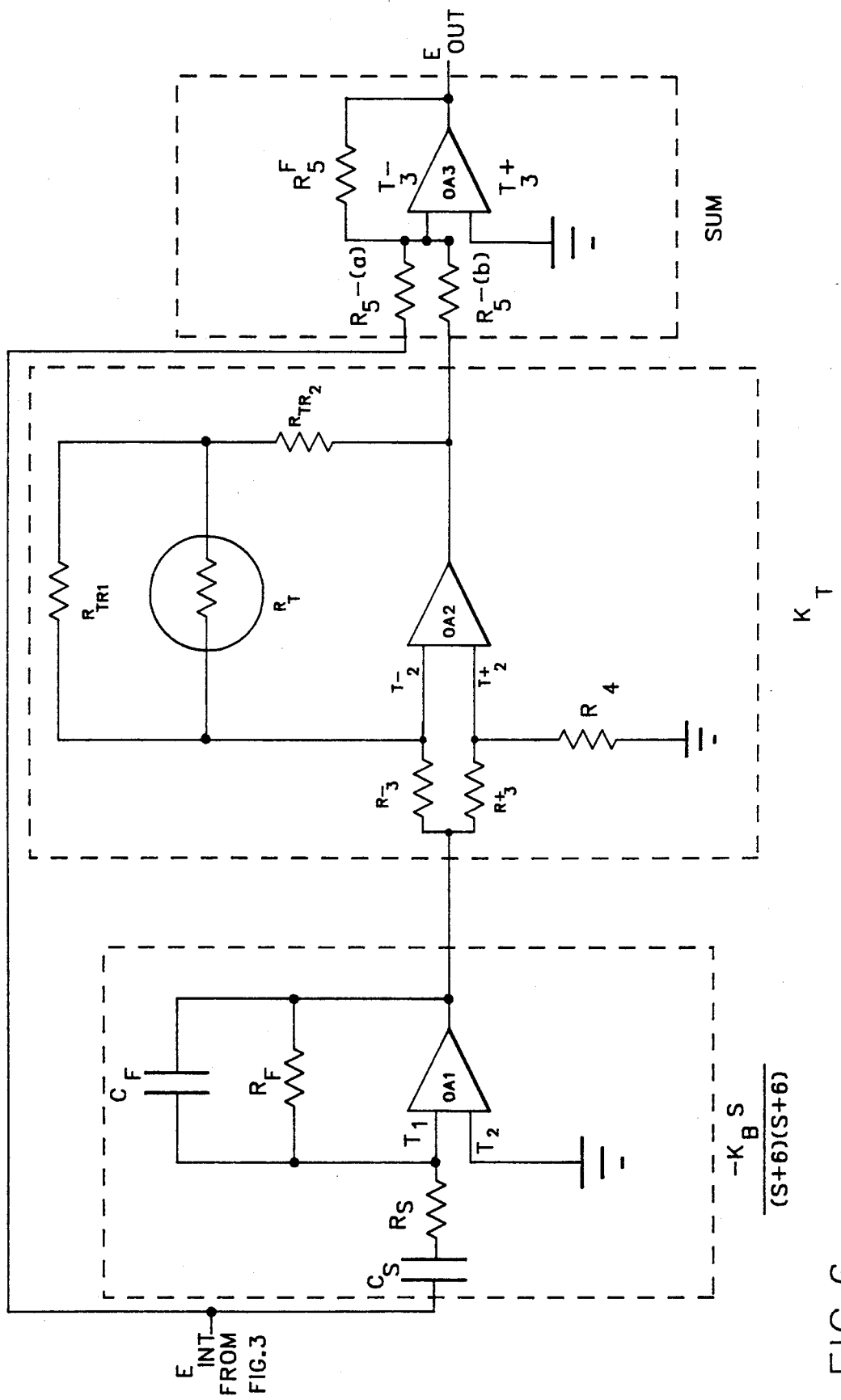
FIG. 6 is a detailed schematic of the filter shown in FIGS. 4 and 5.

Thus, in the circuit implementation of FIGS. 4, 5, and 6, if we make $$R_o = 12,$$

and $$K_B = (-)24,$$

then, solving the above, we obtain $$R_T = 12 + K_B \cdot K_T.$$

Hence, $$\frac{E_{OUT}}{\text{Tilt Angle}} = \frac{K_A}{S^2 + DS + 36} \cdot \frac{S^2 + R_T S + 36}{(S+6)(S+6)}.$$

Thus, if $R_T = D$ at all temperatures, $$\frac{E_{OUT}}{\text{Tilt Angle}} = \frac{K_A}{(S+6)(S+6)},$$

independent of temperature. This is a significant result.

A convenient mechanization, which performs all of these functions, is shown in FIG. 6. This mechanization is especially convenient because, as with the filter as a whole, it passes both the tests of theoretical analysis and actual experience. That is, the mechanization of each component shown in FIG. 6 precisely reproduces, both in theoretical analysis and in actual experience, the requirements of the preceding paragraph. Further, it does so with a minimum of parts, all of which are relatively inexpensive, small, light and not power hungry. An alternative method would be to program a computer to forcibly fit the uncompensated signal to the compensated result, but then all the foregoing advantages would be lost.

The first component, the $K_B S/(S+6)^2$ component, is mechanized by a first op amp $OA_1$, the positive terminal $T_1+$ of which is grounded, and the negative terminal $T_1-$ of which receives a feedback signal from the output of $OA_1$ through a resistance $R_f$ and a capacitance $C_F$ in parallel. The negative input terminal $T_1-$ is also the input terminal for the uncompensated signal, after having been passed through a signal capacitance $C_S$ and a signal resistance $R_S$ in series. The series capacitance $C_S$ is four times that of the feedback capacitance $C_F$; the feedback resistance $R_F$ is four times that of the series resistance $R_S$. In each case, the RC time constant equals 1/6 seconds.

The $K_T$ component is shown in the lower right hand portion of FIG. 6. The incoming signal enters both inputs of a second op amp $OA_2$, in each case first passing through a resistance $R_3-$ or $R_3+$ of a fixed value. The positive terminal $T+_2$ of the op amp $OA_2$ is also grounded through a resistor $R_4$ of the same resistance. The output of the op amp $OA_2$ is fed back through a thermistor RT to the negative input terminal $T_2-$ of the op amp $OA_2$. The thermistor $R_T$ and trimming resistors $R_{TR1}$, $R_{TR2}$ are selected to have a composite resistance equal to the resistance of the previously named resistors at the ideal operating temperature (30° C., where D=12). The resultant signal amplitude is therefore proportional to the deviation of the thermistor from its 30° C. resistance value and furthermore is negative polarity above 30° C. and positive polarity below 30° C. The $K_T$ component, as just described, is equal to zero at 30° C., having no effect whatsoever when the apparatus (and, thus, the thermistor $R_T$) is at 30° C. because both positive and negative input terminals, $T_2+$ and $T_2-$, of the operational amplifier have matched resistor components at this temperature.

The summer SUM is shown at the extreme right side of FIG. 6. $E_{IN}$ passes through a resistor $R_5-(a)$ to the negative terminal $T_3-$ of a third op amp $OA_3$, which also receives a feedback signal from the output of $OA_3$ through a feedback resistor $R_5^F$ of the same value. The output of $OA_2$ also enters the negative terminal $T_3-$ of $OA_3$, first passing through a resistor $R_5-(b)$, of the same value as $R_5-(a)$. $E_{OUT}$, the compensated signal, is produced by the output of $OA_3$.

The final result is produced by feeding the demodulated intermediate voltage $E_{INT}$ from the right side of FIG. 3 into the left side of FIG. 6. $E_{OUT}$ of FIG. 6 is the final signal.

INDUSTRIAL APPLICABILITY

The present invention is capable of exploitation in industry and can be used whenever it is desired to compensate for bubble level fluid temperature in a low power tiltmeter. It can be made from components which, each considered apart from the others, may be entirely conventional, or it can be made from their non-conventional counterparts.

While a particular embodiment of the present invention has been disclosed herein, the true spirit and scope of the present invention is not limited thereto, but is limited only by the following claims.

What is claimed is:

1. In a bubble level based tiltmeter comprising a first tilt conductance which produces a first current and a second tilt conductance which produces a second current, a method for at least partially compensating for bubble level fluid temperature, the method comprising:
    (a) inputting the first current to a first terminal of a difference amplifier and inputting the second current to a second terminal of the difference amplifier, the difference amplifier producing a conductivity compensated voltage;

(b) feeding back the conductivity compensated voltage through a first feedback conductance to the first terminal of the difference amplifier;

(c) inverting the conductivity compensated voltage to produce an inverted voltage; and (d) feeding back the inverted voltage through a second feedback conductance, substantially equal in magnitude to the first feedback conductance, to the second terminal of the difference amplifier.

2. The method of claim 1, further comprising the steps of:

(a) filtering the conductivity compensated voltage through a critically damped bandpass filter to produce a bandpass voltage;

(b) filtering the bandpass voltage through a thermistor filter to produce a thermistor voltage; and (c) summing the thermistor voltage and the conductivity compensated voltage to produce an output voltage.

3. In a bubble level based tiltmeter comprising a first tilt conductance which produces a first current and a second tilt conductance which produces a second current, an apparatus for at least partially compensating for bubble level fluid temperature, the apparatus comprising:

(a) means for inputting the first current to a first terminal of a difference amplifier and inputting the second current to a second terminal of the difference amplifier, the difference amplifier producing a conductivity compensated voltage;

(b) means for feeding back the conductivity compensated voltage through a first feedback conductance to the first terminal of the difference amplifier;

(c) means for inverting the conductivity compensated voltage to produce an inverted voltage; and (d) means for feeding back the inverted voltage through a second feedback conductance, substantially equal in magnitude to the first feedback conductance, to the second terminal of the difference amplifier.

4. The apparatus of claim 3, wherein the first and second currents comprise an ac carrier, the apparatus further comprising means for demodulating at least one of the conductivity compensated voltage and the inverted voltage to produce a dc conductivity compensated voltage.

5. The apparatus of claim 3, further comprising:

(a) means for filtering the conductivity compensated voltage through a critically damped bandpass filter to produce a bandpass voltage;

(b) means for filtering the bandpass voltage through a thermistor filter to produce a thermistor voltage., and (c) means for summing the thermistor voltage and the conductivity compensated voltage to produce an output voltage.

6. The apparatus of claim 5, wherein the critically damped bandpass filter comprises means for multiplying the conductivity compensated voltage by $K_B S$ divided by $(S+6)^2$.

7. The apparatus of claim 5, wherein the critically damped bandpass filter comprises:

(a) a series capacitance and a series resistance in series between a source of the conductivity compensated voltage and a first terminal of an op amp;

(b) a feedback capacitance and a feedback resistance in parallel between an output of the op amp and the first terminal of the op amp, the output of the op amp producing the bandpass voltage., (c) a second, grounded, terminal of the op amp.

8. The apparatus of claim 5, wherein the thermistor filter comprises:

(a) a first input resistance connected between a first terminal of an op amp and a source of the bandpass voltage;

(b) a second input resistance, substantially equal in magnitude to the first input resistance, connected between a second terminal of an op amp and a source of the bandpass voltage;

(c) a thermistor connected in series with a first trimming resistance and in parallel with a second trimming resistance between an output of the op amp and the first terminal of the op amp, the output of the op amp producing the output voltage; and (d) a grounding resistance connected between the second terminal of the op amp and ground.

* * * * *